United States Patent [19]
Wittensoldner et al.

[11] Patent Number: 5,212,370

[45] Date of Patent: May 18, 1993

[54] APPARATUS AND METHOD FOR EXTENDING LASER LIFE BY DISCONTINUOUS OPERATION

[75] Inventors: Christopher J. Wittensoldner; Denis M. Blanford; John K. Burkey, all of Cambridge; Paul O. Detwiler, New Concord; Barry M. Mergenthaler; Wilbur I. Hilles, both of Cambridge; Robert J. Tom, Zanesville, all of Ohio

[73] Assignee: NCR Corporation, Dayton, Ohio

[21] Appl. No.: 618,185

[22] Filed: Nov. 20, 1990

[51] Int. Cl.$^5$ .............................................. G06K 7/10
[52] U.S. Cl. ................................... 235/462; 235/467; 235/470
[58] Field of Search ............... 235/462, 463, 466, 467, 235/470, 472

[56] References Cited

U.S. PATENT DOCUMENTS

| | | | |
|---|---|---|---|
| H,322 | 8/1987 | Simons | 372/29 |
| 4,160,156 | 7/1979 | Sherer | 235/463 |
| 4,240,064 | 12/1980 | DevChoudhury | 340/146.3 AG |
| 4,267,439 | 5/1981 | Thomas et al. | 235/454 |
| 4,639,606 | 1/1987 | Boles et al. | 250/555 |
| 4,709,195 | 11/1987 | Hellekson et al. | 318/254 |
| 4,797,551 | 1/1989 | Ferrante | 235/467 X |
| 4,933,538 | 6/1990 | Heiman et al. | 235/462 |
| 5,023,818 | 6/1991 | Wittensoldner et al. | 235/470 X |
| 5,059,777 | 10/1991 | Wittensoldner et al. | 235/470 |
| 5,073,838 | 12/1991 | Ames | 361/103 |

FOREIGN PATENT DOCUMENTS 0260156 3/1988 European Pat. Off.
2366637 4/1978 France.
1582020 12/1980 United Kingdom.

OTHER PUBLICATIONS

U.S. Ser. No. 410,685, filed Sep. 21, 1989, Christopher J. Wittensolder et al., Assigned to NCR Corporation.
U.S. Ser. No. 410,698, filed Sep. 21, 1989, Christopher J. Wittensoldner et al., Assigned to NCR Corporation.
U.S. Ser. No. 445,225, filed Dec. 4, 1989, Stephen J. Ames, Assigned to NCR Corporation.

Primary Examiner—Eugene R. LaRoche
Assistant Examiner—Christopher R. Glembocki
Attorney, Agent, or Firm—Albert L. Sessler, Jr.

[57] ABSTRACT

The useful life of a laser, such as a laser diode, is extended by causing the laser to operate only intermittently when continuous operation is not required. When such a laser diode is used in a scanner for scanning coded symbols, such as bar codes, in merchandise check-out operations, continuous operation is required only when a coded symbol is present in a target area. A sensing device is provided for sensing the transitions in light reflected back from the target area, and a counter is provided for counting the number of such transitions. Since a much larger number of transitions are sensed and counted when a coded symbol is being read than when no such symbol is present in the target area, this difference in number of transitions is used to distinguish between the two conditions and to cause the laser diode to be turned on for continuous operation only when a coded symbol is present in the target area to be read.

17 Claims, 4 Drawing Sheets

APPARATUS AND METHOD FOR EXTENDING LASER LIFE BY DISCONTINUOUS OPERATION

BACKGROUND OF THE INVENTION

This invention relates to an apparatus and method for extending the useful life of a laser, and more particularly relates to such an apparatus and method in which a laser is kept in continuous operation only during the time that a coded symbol is present in a target area for scanning.

Lasers are used in many different types of devices and systems. One example of such a system is a merchandise checkout system in which a laser is included in a bar code reader for reading data associated with merchandise items purchased by a customer. Data encoded by means of the bar code and read by the reader may include manufacturer data, merchandise data, etc.

One type of laser frequently used in a bar code reader is a laser diode. If a laser diode is maintained continuously in an "on" condition, its lifetime may be relatively short, compared to the remainder of the bar code scanner, and replacement will be necessary. A method is therefore needed to increase the laser diode's lifetime in the operation of a bar code scanner, or other device in which a laser diode may be used.

Prior developments aimed at preventing damage to laser diodes from causes such as excessive temperature are known. One such development is disclosed in U.S. patent application Ser. No. 445,225, filed Dec. 4, 1989, inventor Stephen J. Ames, for "Method and Apparatus for Preventing Damage to a Temperature-Sensitive Semiconductor Device", assigned to the assignee of the present application; now U.S. Pat. No. 5,073,838, issued Dec. 17, 1991.

SUMMARY OF THE INVENTION

The present invention provides an apparatus and method for extending the useful life of a laser by using the laser in such a manner that it is not required to operate continuously, while still enabling the apparatus in which it is used to function in a desired manner.

In accordance with a first embodiment of the invention, apparatus for extending the life of laser means comprises: laser means for providing a light beam; means for driving said laser means discontinuously; means for applying light from said laser means to a target area comprising motor driven rotating optical scan means and motor means for driving said optical scan means; detector means for sensing light reflected back from said target area and generating signals representative of said light and includng transitions of said reflected light from a relatively light state to a relatively dark state and vice versa; means for counting the number of transitions in a given period of time to obtain a count of transitions per time period; means for evaluating said number of transitions in a given period of time to determined whether said count is relatively low and represents the absence of a coded symbol in said target area, or is relatively high and represents the presence of a coded symbol in said target area; first control means coupled to said evaluating means and to said means for driving the laser means for causing continued operation of said laser means when said evaluating means indicates that said coded symbol is being sensed; and means for determining said given period of time comprising detection means for measuring the speed of said motor means.

In accordance with a second embodiment of the invention, a method for operating a system including a laser, a scanning device, an activity timer, a motor for driving the scanning device, a sensor coupled to the motor for detecting revolutions thereof, and a video pulse counter, comprises the following steps: a) turning on ther laser; b) performing a scan operation to determine the presence or absence of activity in the area being scanned; c) if activity is present, restarting the activity timer: d) determining whether the activity timer times out to indicate a lack of activity in the area being scanned; e) when the activity timer times out, determining the state of the sensor coupled to the motor; f) when the sensor output is in one of two states, turning the laser on and resetting the video pulse counter; g) following step (f), when the sensor output is in the other of the two states, turning the laser off and getting a video pulse count; h) determining whether the video pulse count indicates activity in the area being scanned; i) if activity is indicated, restarting the activity timer and returning to step (a); j) if no activity is indicated, repeating the steps of turning on and off of the laser, obtaining a pulse count, and determining activity, until activity is indicated.

It is accordingly an object of the present invention to provide an apparatus and method for laser life extension.

Another object is to provide a scanner having a laser in which the laser is not required to operate continuously.

Another object is to provide a scanner having a laser in which the laser operates in a discontinuous mode in sensing a target area until the presence of a coded symbol in the target is detected, at which time the laser begins to operate continuously.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
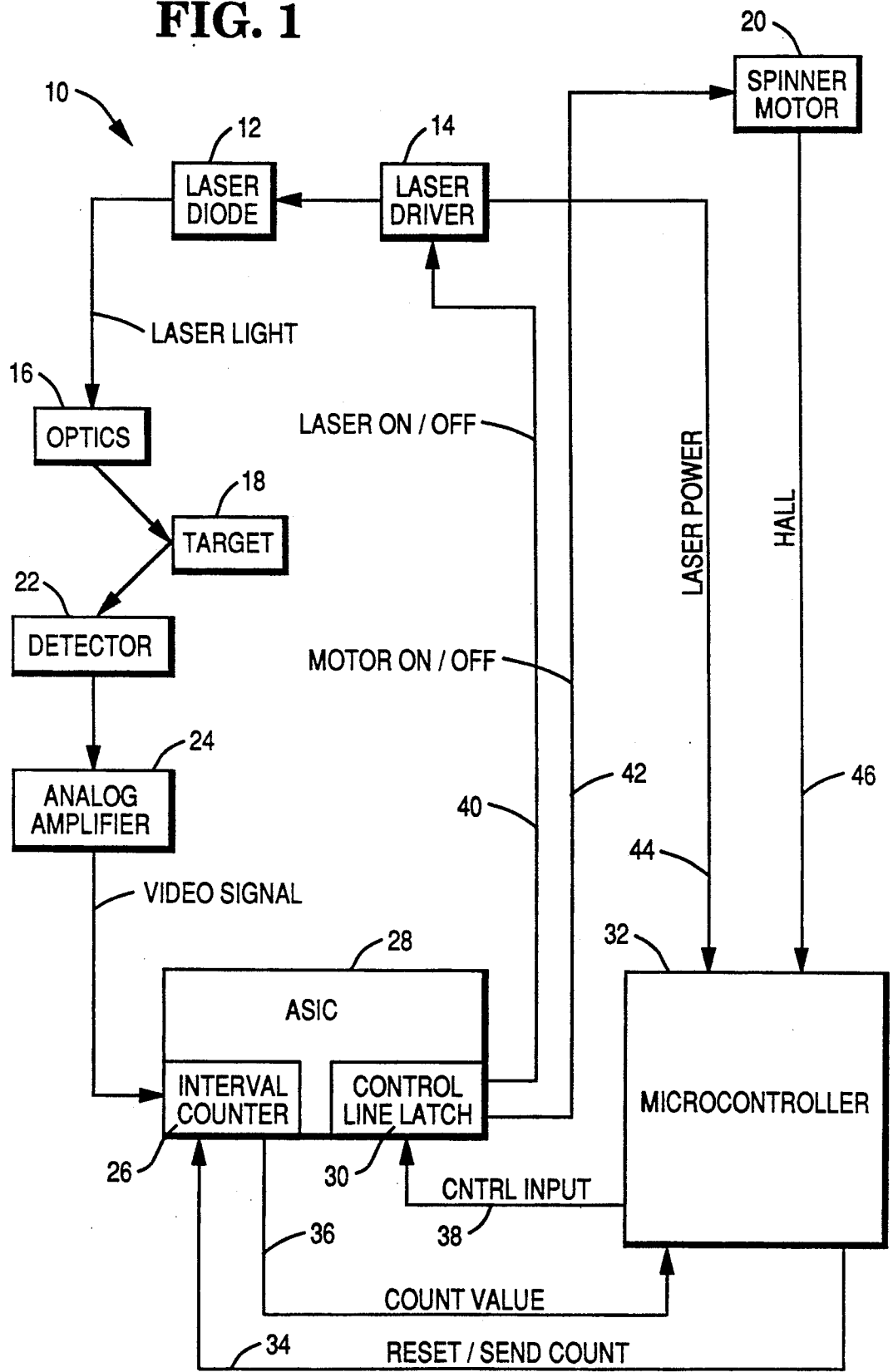
FIG. 1 is a block diagram of the elements of the laser operating system.

Referring now to FIG. 1, shown there is a diagrammatic representation of a laser operating system 10. Included in the system 10 is a laser device 12, which may be a laser diode, and which typically will be a 3-6 mW device that has a photodiode incorporated therewith for power monitoring. A laser driver 14 is provided for the laser diode 12, and comprises a suitable feedback control circuit that will maintain a constant laser diode output power depending upon the output of the photodiode which is associated with the laser diode. As will be subsequently described in greater detail, the laser driver 14 receives a laser on-off control signal from a control line latch and outputs an open collector signal to a microcontroller if the laser is on.

Figure 3:
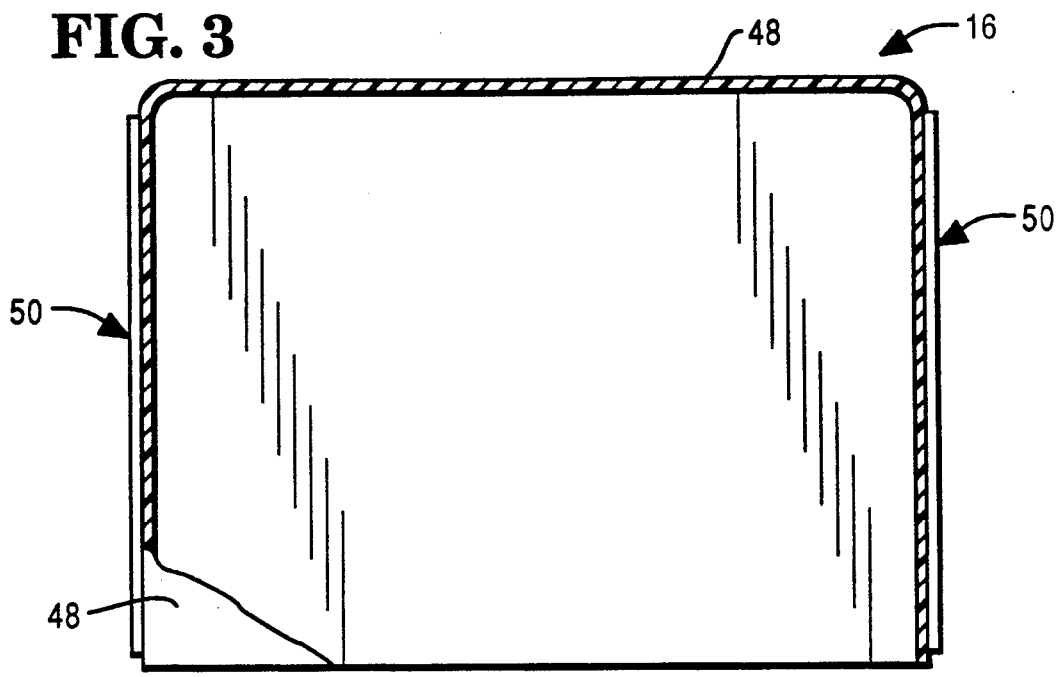
FIG. 3 is a diagrammatic view, partially in section, of the spinner cup portion of the optical system.

The light output from the laser diode 12 is applied to an optical system 16, which comprises a system of stationary mirrors, lenses and a mirrored spinner that create a pattern for scanning a coded symbol in a target area 18 The scanning spinner is driven by a spinner motor 20, which may be a one, two or three phase motor. FIG. 3 shows a plastic spinner cup 48, which forms part of the optical system 16. A plurality of mirrors 50 are attached to the spinner cup 48, which in turn is secured to a cup portion of the spinner motor 20. An optical system which is suitable for use in the present system 10 is shown in U.S. Pat. No. 4,797,551, dated Jan. 10, 1989, assigned to the assignee of the present application.

The light reflected from the target area 18 is collected and focused onto a detector 22, which detects said light, generates an analog signal therefrom, and transmits said signal to an analog amplifier 24. The detector may utilize a photodiode of type BPW34, manufactured by Siemens, and available through Electronic Sales Master Incorporated, Beachwood, Ohio. The analog amplifier circuit converts the photodiode current to a filtered voltage with 20 Mohm of gain. The video output transition, representing a shift in sensed light condition from light to dark or vice versa, is created from the second derivative of this voltage. The video signal from the amplifier 24 is applied to an interval counter 26, which forms part of an application specific integrated circuit (ASIC) 28. The counter 26 is incremented on each transition of the video signal from the amplifier 24, and is reset under control of an associated microcontroller 32, as will be subsequently described in greater detail. The ASIC 28 also includes a control line latch 30, for latching certain control lines, as will subsequently be described.

The microcontroller 32 may be of type 80C194, marketed by Intel Corporation, Santa Clara, Calif. The interval counter 26 is controlled by the microcontroller 32 via a path 34 to be reset or to provide the microcontroller with a count value. The count value is transmitted to the microcontroller from the interval counter via a path 36. The microcontroller 32 also exercises control over the laser 12 and the motor 20 by a path 38 extending to the control line latch 30. From the latch 30 control paths 40 and 42 extend to the laser driver 14 and the motor 20, respectively. Information as to whether the laser 12 is in an on or off state is provided to the microcontroller 32 from the laser driver 14 via a path 44, and information concerning the operation of the motor 20 is provided to the microcontroller 32 from the motor 20 via a path 46.

Figure 4:
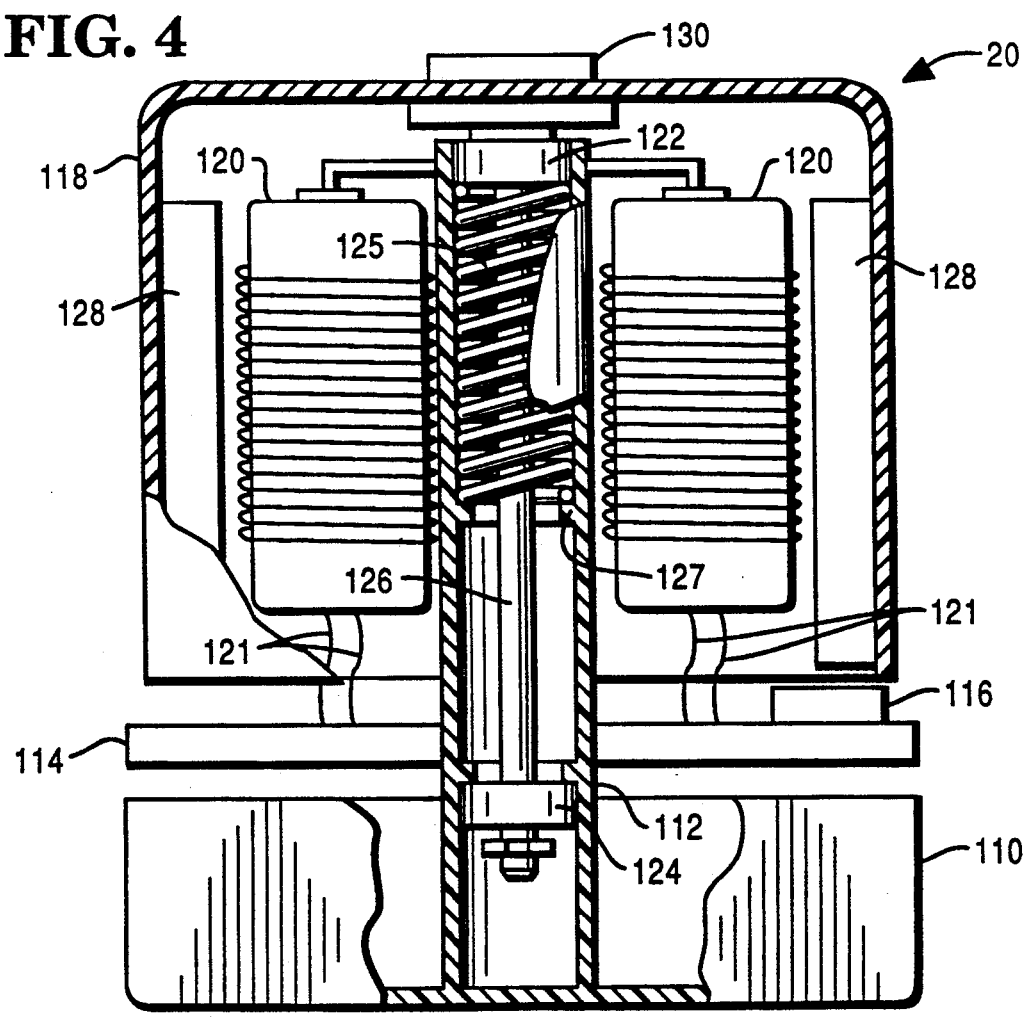
FIG. 4 is a diagrammatic view, partially in section, of the motor which drives the optical system of the scanner of the system, showing the Hall effect device which senses the rotation of the motor.

A two-phase spinner motor 20 is shown diagrammatically in FIG. 4. A base 110 is mounted to a scanner frame, to an optics box, or to some other element of the system by suitable means, such as screws or an adhesive. The base 110 includes a hollow pillar 112, which may be of plastic or other suitable material. A printed circuit board 114 is mounted in a fixed position on the pillar 112 in spaced relation to the base 110, by means of an opening therein which receives the pillar 112. The board 114 contains motor control circuitry and also mounts a Hall effect sensing device 116.

The pillar 112 extends within a cup 118 of the motor 20 and supports said cup for rotational movement. In addition, a plurality of motor windings 120 are mounted on the pillar in fixed relation, and are connected by wires 121 to the circuit board 114. Upper and lower bearings 122 and 124 receive a pin 126 which is fixed to and supports the cup 118 for rotation about the longitudinal axis of said pin. A spring 125 engages the bearing 122 and an annular shelf on the interior wall of the pillar 112 to maintain the cup the 118 in proper operative position. Secured to the inner surface of the cup 118 is a four-pole magnet 128 which interacts with the windings 120 to cause operation of the motor 20, and which also interacts with the Hall device 116 to produce the Hall signals which are transmitted to the microcontroller 32 via the path 46 (FIG. 1). Since the magnet 128 has four poles, it will be seen that two maximum and two minimum analog signals will be produced by the Hall device 116 during each complete revolution of the cup 118. These analog signals are converted to digital binary signals for use in the microcontroller 32.

An upper element 130 is part of the cup 118 and rotates with it. The optical spinner cup 48 is secured to the cup 118 for rotation therewith by any suitable means, such glue or a snap fitting.

The microcontroller 32 is programmed so that selectively either between individual merchandise tags carrying coded symbols, or between customers (sets of tags), a signal will be sent to the laser driver 14 to pulse the laser diode 12 (via the laser on/off path 40) to create a partial scan pattern which is sensed by the detector 22. The timing for this pattern is based upon the Hall output signals from the motor 20 applied via the path 46 to the microcontroller 32. The video signal produced by the reflected partial scan pattern will be characteristic of the environment of the target area in the absence of a coded symbol to be scanned. As a coded symbol enters the target area, the video signal will change, with the video signal representing scanning of the coded symbol producing a much higher number of transitions than when no coded symbol is present. Typically, when no tag containing a coded symbol is present, the number of transitions counted by the interval counter 26 will be relatively small, perhaps up to a maximum of approximately 10,000 per second. When a coded symbol is being sensed, the number of transitions is much higher, typically in the range of from 100,000 to 1,000,000 transitions per second. The microprocessor 32 is programmed to distinguish between these ranges, and to control the operation of the laser diode 12 in accordance with whether or not a coded symbol is present in the target area. Thus the laser diode is operated in a pulsed discontinuous mode when no coded symbol is present in the target area, and is operated in a continuous mode when such a coded symbol is present. Operating the laser diode 12 in a discontinuous mode at all times except when a coded symbol is actually present in the target area means that the diode is operating continuously for a relatively small portion of the time, thereby extending its life.

Figure 2A:
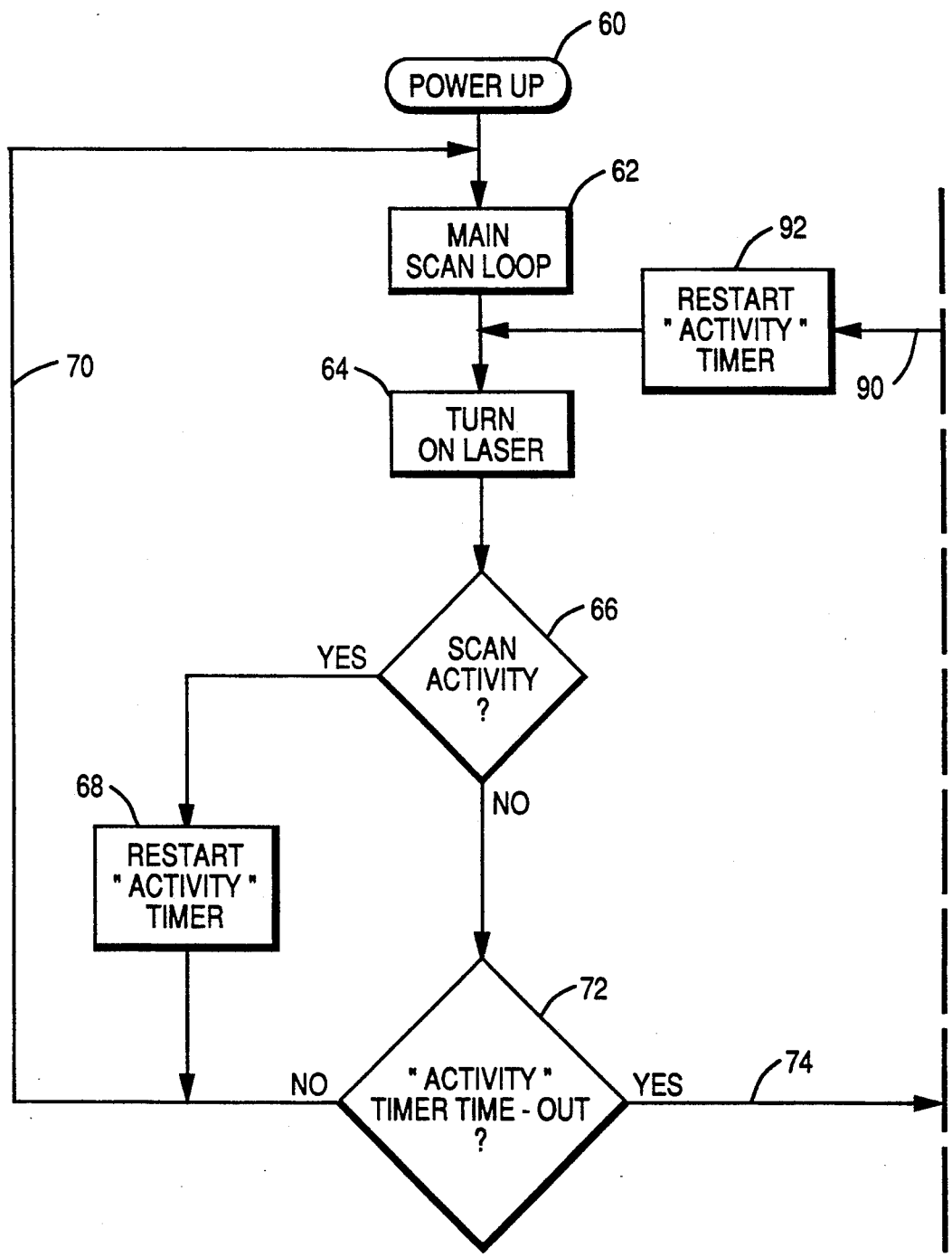
FIGS. 2A and 2B, taken together, constitute a flow diagram of a process for operating the laser diode.
Figure 2B:
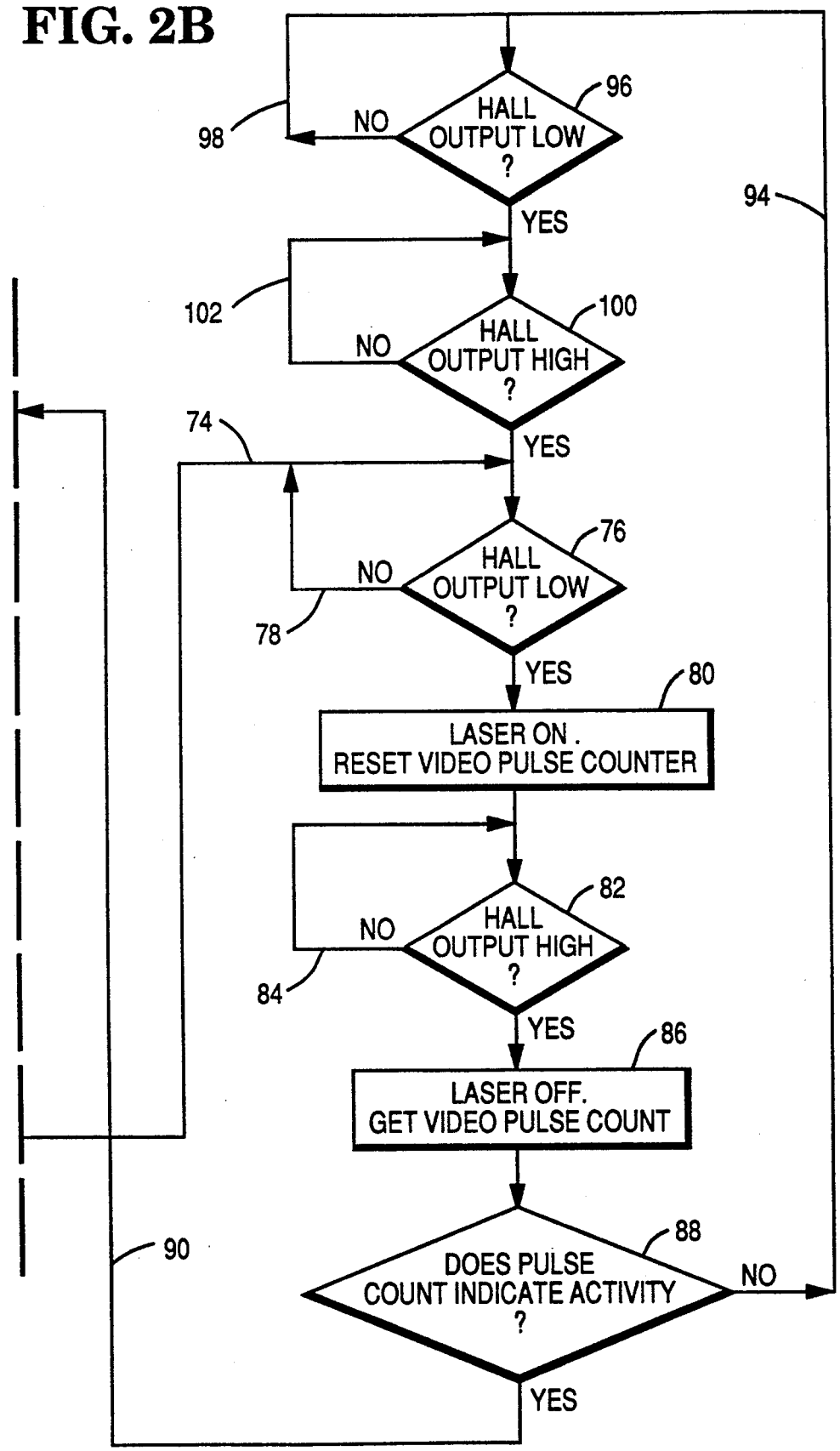

Referring now to the flow diagram of FIGS. 2A and 2B, these figures taken together constitute a flow diagram of the process performed by the system 10 during scanning operations. As represented by block 60 of FIG. 2A, the system is first powered up, that is, "awakened" from a "sleep" mode in which the laser diode is turned off. Main scan loop operations are then initiated, as represented by block 62. In this loop, the system attempts to form data for, and recognize, a complete tag or coded symbol from the video signal. The laser diode 12 is then turned on, as represented by block 64.

Next, as represented in block 66, the system determines whether or not there is any scan activity, such as recognition of a tag or partial tag. If such scan activity is present, an "activity" timer is restarted, as represented by block 68, and the process returns to block 62 via path 70. The "activity" timer is not a part of the present invention, and is used to turn the laser diode off after a period of activity if no further activity is noted during a specified period of time.

If no scan activity is present, the process continues to block 72, in which a determination is made as to whether the previous time period of the "activity" timer has timed out. If additional activity takes place before the time-out, the process loops back to block 62 via path 70. However if the "activity" timer does time out, the process continues via path 74 to block 76 (FIG. 2B), in which a determination is made as to whether or not the Hall output signal on path 46 from the motor 20 (FIG. 1) is low. If it is not low, the process continues to loop via path 78 back through the block 76 until said signal is low. When the Hall output is low, as represented by block 80, the laser diode 12 is turned on if it is not already on, and the reset pulse counter 26 is reset to zero.

After the pulse counter is reset to zero, a determination is made (block 82) as to whether or not the Hall output is high. If it is not, the process loops via path 84 and through block 82 until it is. When the Hall output is determined to be high, the process continues to block 86, in which the laser diode 12 is turned off and the video pulse count is read from the counter 26. It may be noted that the video pulse count is that which takes place during ninety degrees of rotation of the motor 20.

A determination is next made, as represented in block 88, as to whether the magnitude of the pulse count indicates activity in the target area. The method employed for this determination may be a comparison against a standard or index which is stored in the microcontroller memory, and which may be obtained in a table look-up operation, or may be a comparison against a computed average of previous readings. Using the latter method, a few loops of the process may be made to obtain a plurality of counts which can be averaged, and then activity will be indicated when there is a substantial increase in the most recent count over the previously obtained average.

If activity is indicated in block 88, the process continues via path 90 to block 92 (FIG. 2A), in which the activity timer is restarted, after which the process continues to the previously described block 64, in which the laser diode 12 is turned on. Continuous operation of the laser diode 12 ensues for as long as activity in the target area continues.

If the pulse count does not indicate activity in block 88, the process continues via path 94 to block 96, in which a determination is made as to whether the Hall input of the motor 20 is low. If not, the process loops over path 98 and the block 96 until the Hall input becomes low, after which a determination is made as to whether the Hall input is high (block 100), and the process loops over path 102 until the Hall input becomes high. The process then continues to previously described block 76 and path 78, in which the system loops until the Hall input once again reaches a low state, so that the correct timing is attained for the laser to be turned on and the video pulse to be reset, as represented by block 80. Each transition from low to high and vice versa of the Hall output takes place during ninety degrees of rotation of the motor 20.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. Apparatus for extending the life of laser means, comprising:
    laser means for providing a light beam;
    means for driving said laser means discontinuously;
    means for applying light from said laser means to a target area comprising motor driven rotating optical scan means and motor means for driving said optical scan means;
    detector means for sensing light reflected back from said target area and generating signals representative of said light and including transitions of said reflected light from a relatively light state to a relatively dark state and vice versa;
    means for counting the number of transitions in a given period of time to obtain a count of transitions per time period;
    means for evaluating said number of transitions in a given period of time to determine whether said count is relatively low and represents the absence of a coded symbol in said target area, or is relatively high and represents the presence of a coded symbol in said target area;
    first control means coupled to said evaluating means and to said means for driving the laser means for causing continued operation of said laser means when said evaluating means indicates that said coded symbol is being sensed; and
    means for determining said given period of time comprising detection means for measuring the speed of said motor means.

2. The apparatus of claim 1, in which said detection means provides a signal comprising four alternating binary states for each revolution of the motor means of the scan means.

3. The apparatus of claim 1 in which said detection means comprises a Hall effect device.

4. A method for operating a system including a laser, a scanning device, an activity timer, a motor for driving the scanning device, a sensor coupled to the motor for detecting revolutions thereof, and a video pulse counter, comprising the following steps;
    a) turning on the laser;
    b) performing a scan operation to determine the presence or absence of activity in the area being scanned;
    c) if activity is present, restarting an activity timer;
    d) determining whether the activity timer times out to indicate a lack of activity in the area being scanned;
    e) when the activity timer times out, determining the state of the sensor coupled to the motor;
    f) when the sensor output is in one of two states, turning the laser on and resetting the video pulse counter;
    g) following step (f), when the sensor output is in the other of the two states, turning the laser off and getting a video pulse count;

h) determining whether the video pulse count indicates activity in the area being scanned;

i) if activity is indicated, restarting the activity timer and returning to step (a);

j) if no activity is indicated, repeating the steps of turning on and off of the laser, obtaining a pulse count, and determining activity, until activity is indicated.

5. The method of claim 4, in which the laser is a laser diode.

6. The method of claim 4, in which the sensor comprises a Hall effect device.

7. The method of claim 4, in which a state of activity is represented by a video pulse count of at least 100,000 pulses per second.

8. The method of claim 4, in which a state of no activity is represented by a video pulse count of zero to 10,000 pulses per second.

9. The method of claim 4, in which each state of the sensor represents one-fourth of a revolution of the motor, with opposite states being successively sensed.

10. A method for operating a system including a laser, a scanning device, an activity timer, a motor for driving the scanning device, a sensor coupled to the motor for detecting revolutions thereof, and a video pulse counter, comprising the following steps:

a) turning on the laser;

b) performing a scan operation to determine the presence or absence of activity in the area being scanned;

c) if activity is present, restarting the activity timer;

d) determining whether the activity timer times out to indicate a lack of activity in the area being scanned;

e) when the activity timer times out, determining the state of the sensor coupled to the motor;

f) if the sensor output is in a first state, waiting until it assumes a second state;

g) when the sensor output is in a second state, turning the laser on and resetting the video pulse counters;

h) determining the state of the sensor coupled to the motor;

i) when the sensor output is in said first state, turning the laser off and getting a video pulse count;

j) determining whether the video pulse count indicates activity in the area being scanned;

k) if activity is indicated, restarting the activity timer and returning to step (a);

l) if activity is not indicated, determining whether the sensor output is in said second state, and if not, waiting until the sensor output is in said second state;

m) following step (1), determining whether the sensor output is in said first state, and if not, waiting until said sensor output is in said first state; and n) after step (m), repeating steps (e), (f), (g), (h), (i), (j), (1) and (m) continuously until activity is indicated in step (j).

11. The method of claim 10, in which the laser is a laser diode.

12. The method of claim 10, in which the sensor comprises a Hall effect device.

13. The method of claim 10, in which a state of activity is represented by a video pulse count of at least 100,000 pulses per second.

14. The method of claim 10, in which a state of no activity is represented by a video pulse count of zero to 10,000 pulses per second.

15. The method of claim 10, in which each state of the sensor represents one-fourth of a revolution of the motor, with opposite states being successively sensed.

16. The method of claim 10, in which step (j) includes the step of comparing the video pulse count with a previously established standard.

17. The method of claim 10, in which step (j) includes the step of comparing the video pulse with an average of previous video pulse counts.

* * * * *

UNITED STATES PATENT AND TRADEMARK OFFICE
CERTIFICATE OF CORRECTION

PATENT NO. : 5,212,370

DATED : May 18, 1993

INVENTOR(S) : Christopher J. Wittensoldner et al.

It is certified that error appears in the above-identified patent and that said Letters Patent is hereby corrected as shown below:

Column 6, line 56, change "an" to --the--.

Signed and Sealed this

Fifth Day of April, 1994

*Attest:*

BRUCE LEHMAN

*Attesting Officer*  *Commissioner of Patents and Trademarks*